(No Model.)
J. S. WHITWORTH.
CAR BRAKE LEVER.
No. 358,907. Patented Mar. 8, 1887.
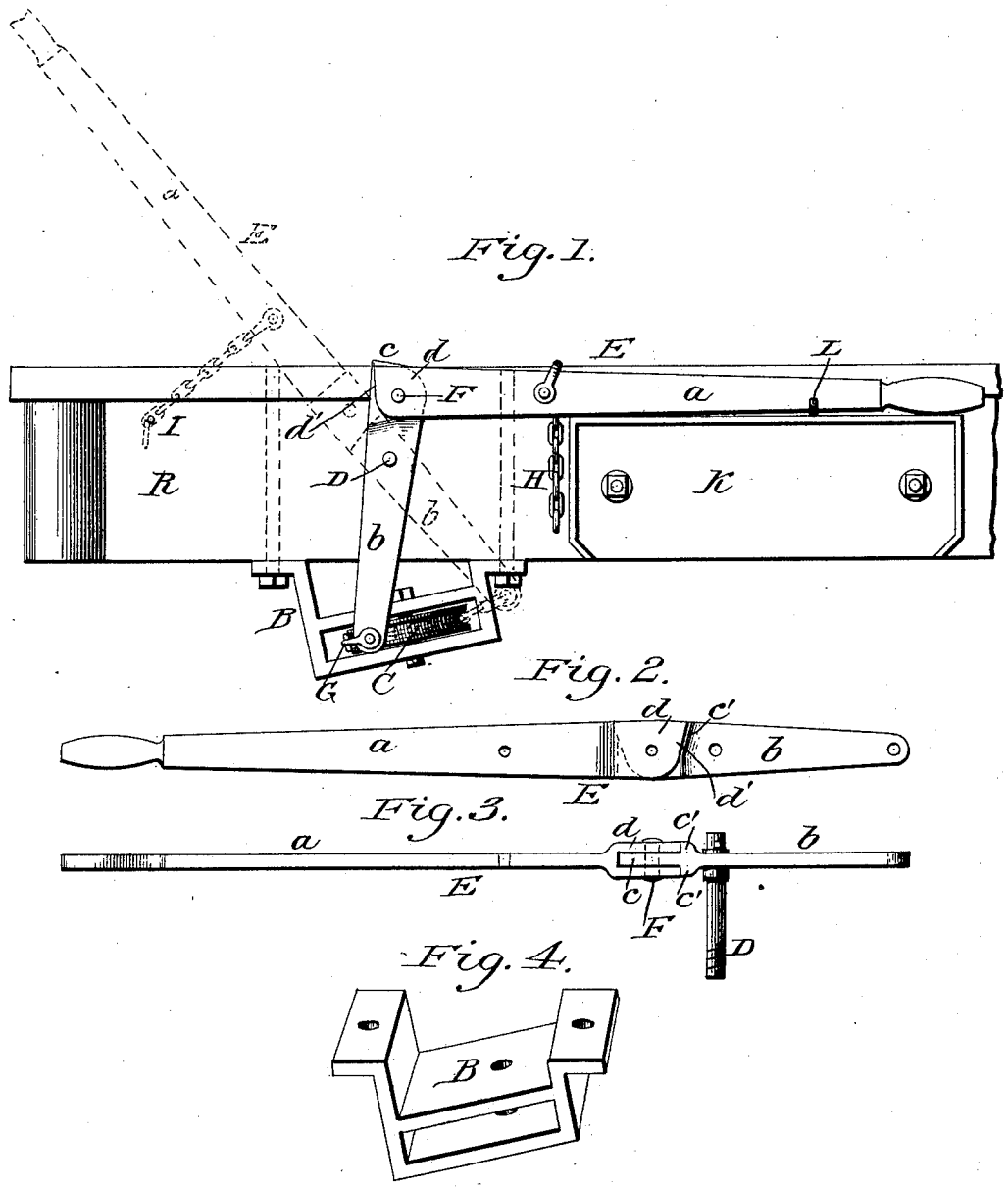
Witnesses.
Chas. A. Wood
R. H. Barrett
Inventor:
Jno. S. Whitworth

UNITED STATES PATENT OFFICE.

JOHN S. WHITWORTH, OF BERKLEY, VIRGINIA.

CAR-BRAKE LEVER.

SPECIFICATION forming part of Letters Patent No. 358,907, dated March 8, 1887.

Application filed July 21, 1886. Serial No. 208,676. (No model.)

*To all whom it may concern:*

Be it known that I, JOHN S. WHITWORTH, of Berkley, county of Norfolk, State of Virginia, have invented a new and Improved Railway-Car Lever-Brake; and I do hereby declare that the following is a full, clear, and exact description thereof, which will enable others skilled in the art to make and use the same, reference being had to the accompanying drawings, forming part of this specification, in which—

Figure 1 shows the end sill of a car with my brake-lever applied thereto. Fig. 2 is a side view of the lever. Fig. 3 is an edge view of the same. Fig. 4 is a perspective view of the frame or box for the chain-sheave.

The same letters refer to corresponding parts in all the views.

To the under side of the end sill, A, of a car, is secured an open box or frame, B, in which is journaled a sheave, C. A stud-bolt, D, is fastened into the sill A above the frame B. On this bolt is pivoted a lever, E, which is composed of two parts, $a$ and $b$, united by a knuckle-joint just above the stud-bolt D. The part $a$ is of such a length as not to project above the floor of the car, while its lower end lies near the sheave C. One end of a chain, G, is attached to this end of the lever, the chain passing thence around the sheave C to the brake-rod.

The knuckle-joint is composed of a tongue, $c$, on the part $a$ of lever E and a fork, $d$, on the part $b$, which tongue and fork are united by a pin, F. The lower ends of the fork $d$ are beveled, as shown at $d'$, and at the base of the tongue $c$ are two inclined shoulders, $c'$ $c'$, so that when the part $b$ of the lever is lifted up from the position in which it is shown in full lines in Fig. 1 and is brought into line with the part $a$ the bevels $d'$ $d'$ meet the shoulders $c'$ $c'$ at the base of the tongue, thus forming a rigid lever, the two parts $a$ and $b$ moving together as though in one piece. The lever may then be thrown over to the position shown in dotted lines in Fig. 1, causing the chain G to be drawn around the sheave C and applying the brake. A short chain, H, is attached to the lever E, and one of its links may be slipped over the pin or hook I, if it is desired to lock the lever in that position. Upon bringing the lever back to an upright position the brake is released, and the upper part, $b$, of the lever may then be turned down upon the buffer-block K, or upon a suitable stop, L, so as to lie about parallel with the floor of the car. In this position no part of the brake mechanism projects above the plane of the floor of the car, and a clear space is afforded for loading and unloading. This feature is especially advantageous in transporting lumber, where the length of the stuff is sometimes such as to require two or more cars to take it.

It is desirable that the sheave C should always lie about parallel with the chord of the arc described by the lower end of the lever E, and should it be found convenient or necessary at any time to locate the stud-bolt D over one edge of the sheave C, as shown in the drawings, instead of directly over its center, the frame B may be made inclined, as shown, in order to preserve this relative position of sheave and lever.

Having thus described my invention, what I claim, and desire to secure by Letters Patent, is—

1. A car-brake lever composed of two parts united by a knuckle-joint, so that one part may be turned down out of the way when the lever is not in use, substantially as and for the purpose set forth.

2. The combination, with a railway-car, of a brake-lever pivoted to the end sill of the car and composed of two parts united by a knuckle-joint, the lower part being of such a length as not to project above the plane of the floor of the car, substantially as and for the purpose set forth.

3. The combination, with sill A, of lever E, composed of two parts, $a$ and $b$, united by a knuckle-joint, $c$ $d$, the tongue $c$ having two inclined shoulders, $c'$ $c'$, and the fork $d$ having inclined ends $d'$, substantially as and for the purpose set forth.

4. The combination, with sill A, of frame B, sheave C, stud-bolt D, lever E, composed of two parts united by a knuckle-joint, chains G H, and pin I, substantially as and for the purpose set forth.

JOHN S. WHITWORTH.

Witnesses:
CHAS. S. WOOD,
ROBERT W. BARRETT.